United States Patent
Sorvino et al.

(10) Patent No.: US 7,779,529 B2
(45) Date of Patent: **\*Aug. 24, 2010**

(54) METHOD OF COUPLING A DEVICE TO A MATING PART

(75) Inventors: Alfred Sorvino, Tucson, AZ (US); Hilario Tejeda, Huntington Beach, CA (US); Randy Thompson, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/274,587

(22) Filed: Nov. 20, 2008

(65) Prior Publication Data

US 2009/0070984 A1    Mar. 19, 2009

Related U.S. Application Data

(63) Continuation of application No. 10/890,694, filed on Jul. 14, 2004, now Pat. No. 7,467,457.

(51) Int. Cl.
*H01S 4/00* (2006.01)

(52) U.S. Cl. .......................... 29/592.1; 29/235; 29/450; 29/451; 29/888.3; 174/76; 174/77 R; 174/252; 174/350; 174/521; 257/703; 257/713; 310/347; 361/704; 361/705; 361/713; 361/818

(58) Field of Classification Search .............. 29/235, 29/592.1, 450, 451, 888.3; 174/76, 77 R, 174/252, 350, 521; 257/703, 713; 310/347; 361/704, 705, 713, 818
See application file for complete search history.

(56) References Cited

U.S. PATENT DOCUMENTS

| | | | |
|---|---|---|---|
| 3,180,015 A | 4/1965 | Willard et al. | |
| 3,639,978 A | 2/1972 | Schurman | |
| 4,200,341 A | 4/1980 | Kauschke | |
| 4,674,674 A * | 6/1987 | Patterson et al. | 228/176 |
| 5,054,821 A | 10/1991 | Hillstead | |
| 5,150,443 A * | 9/1992 | Wijnberg | 385/107 |
| 5,842,489 A * | 12/1998 | Suhonen et al. | 132/321 |
| 5,862,578 A | 1/1999 | Castleman | |
| 6,097,598 A | 8/2000 | Miyahara | |

OTHER PUBLICATIONS

"EMI Shielding/Grounding Spacer Gaskets", brochure by Chomerics, date unknown, 3 pp.
"CHO-SEAL & CHO-SIL Conductive Elastomers", brochure by Chomerics, date unknown, 7 pp.
"Thermal-mechanical models for non-conforming surface contacts", Yovanich, M.M.; Thermal and Thermomechanical Phenomena in Electronic Systems, 2000, ITHERM 2000, The Seventh Intersociety Conference on vol. 1, May 23-26, 2000; pp. 290-295.

\* cited by examiner

*Primary Examiner*—Paul D Kim
(74) *Attorney, Agent, or Firm*—Renner, Otto, Boisselle & Sklar, LLP

(57) ABSTRACT

A coupling between a device and a mating part includes an elastic material and perhaps a tensioner coupled to the elastic material. The elastic material is wrapped around at least part of the device. The tensioner or other method is used to stretch the elastic material, thereby reducing the thickness of the elastic material. With the thickness of the elastic material reduced by the stretching, the device is inserted into a hole in a mating part. Then the tension on the elastic material is removed, allowing the elastic material to increase in thickness, so as to fill at least part of the gap between the device and the mating part. The coupling may act as an effective heat transfer device for transmitting (by conduction) heat produced by the heat-producing device, to the mating part, which may act as, or be thermally coupled to, a heat sink.

21 Claims, 8 Drawing Sheets

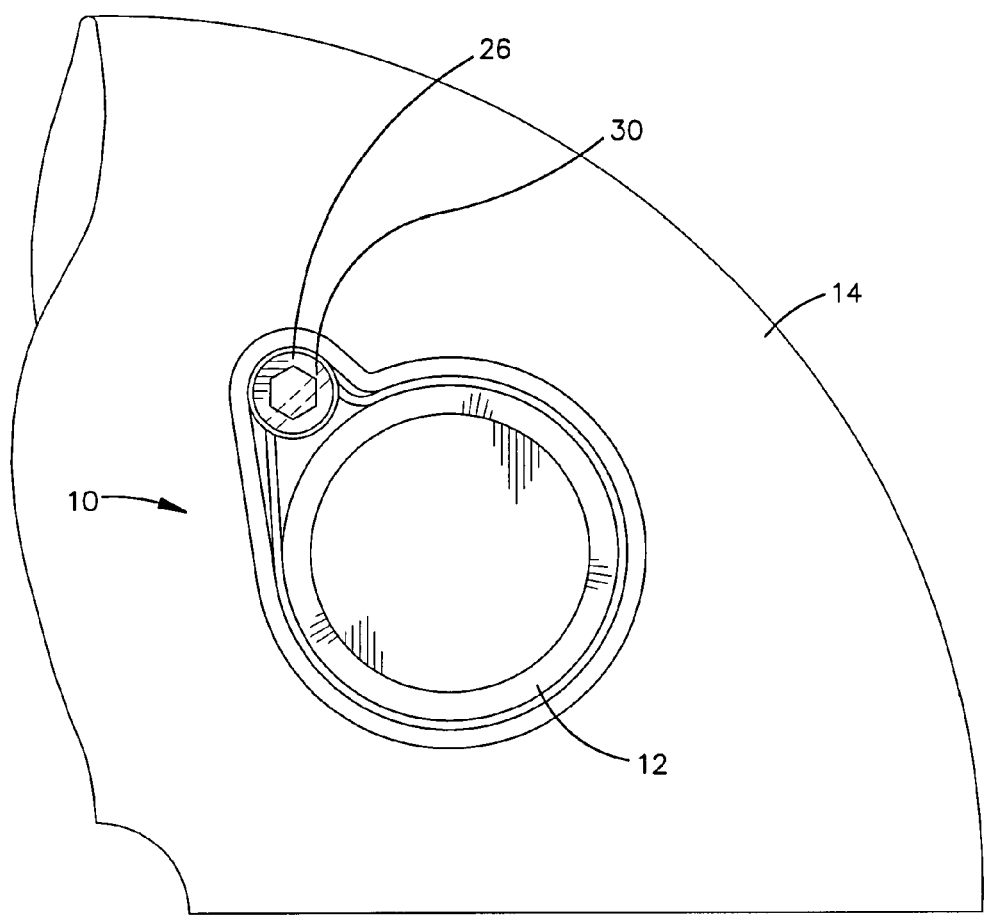
Fig.3
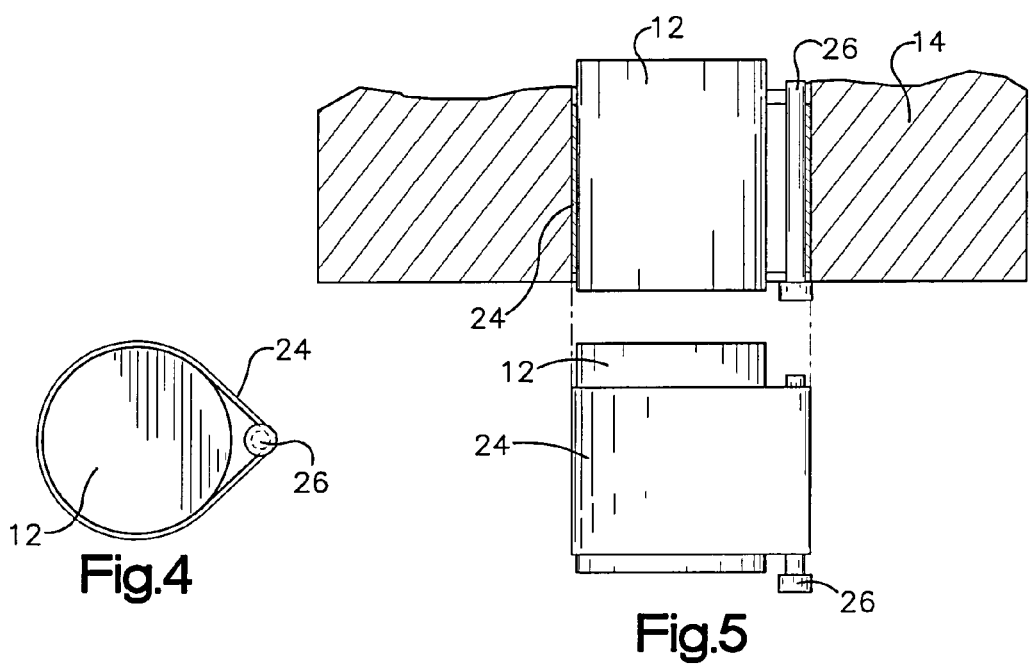
Fig.4
Fig.5

METHOD OF COUPLING A DEVICE TO A
MATING PART

This application is a continuation of U.S. application Ser. No. 10/890,694, filed Jul. 14, 2004 now U.S. Pat. No. 7,467,457, which is incorporated herein by reference in its entirety.

BACKGROUND OF THE INVENTION

1. Technical Field of the Invention

The invention relates generally to methods and devices for coupling a device to a surrounding mating part. More specifically, the invention relates to coupling methods and devices that provide high rates of thermal transfer, good anti-rotation characteristics, and/or shielding against electromagnetic interference.

2. Background of the Related Art

One perennial problem in design and configuration of electromechanical systems is removal of excess heat created during operation of electromechanical devices, such as motors, batteries, and electronics units. It is desirable that heat produced by such devices be conveyed to surrounding housings or other heat sinks. A difficulty in conveying the heat from the heat-producing electromechanical devices to the surrounding heat sinks has been conveying the heat across a gap between the device and the heat sink. One prior attempt at solving this problem has been to provide tightly toleranced mating surfaces between the heat-producing device and the surrounding heat sink or housing, so as to minimize the air gaps between the heat source and the mating part. It will be appreciated that tight tolerances may be difficult to successfully manufacture, and in any case, may increase manufacturing costs and complexity. Also, even small air gaps may involve a large thermal resistance, due to the low thermal conductivity of air.

Another approach has been to place a thermal grease into the gap between the electromechanical heat source, and the mating part. Such a thermal grease has the advantage of having a much higher thermal conductivity then air, thereby making for a low thermal resistance between the heat source and the mating part. Such thermal greases typically are petroleum-based materials, with metallic particles therein, for increased thermal conductivity. However, such thermal greases have the drawback of being viscous, and difficult to place only in the gap. When the thermal grease gets into an undesired area, it can be very difficult to clean.

From the foregoing it will be appreciated that there is room for improvement in the general field of thermal transfer between heat-producing devices and mating parts.

SUMMARY OF THE INVENTION

According to an aspect of the invention, a method of coupling a device to a mating part includes the steps of: stretching an elastic material that is in contact with the device; inserting the elastic material and the device into a hole in the mating part; and relaxing the elastic material, thereby allowing the elastic material to fill at least part of a gap between the heat-producing device and the mating part.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

In the annexed drawings, which are not necessarily to scale:

FIG. 3 is a high-level flowchart of a method of coupling in accordance with the present invention;

FIG. 4 is a plan view illustrating placement of the coupling of FIG. 1 on a heat-producing device, and stretching of the elastic material of the coupling, in order to reduce the thickness of the elastic material;

FIG. 5 is a partially cutaway side view, illustrating installation of a heat-producing device and the coupling of FIG. 1, into a mating part;

DETAILED DESCRIPTION

A coupling between a device, such as a motor, battery, or electronic device, and a mating part, includes an elastic material and perhaps a tensioner coupled to the elastic material. The elastic material is wrapped around at least part of the device. The tensioner is used to stretch the elastic material, or the elastic material is otherwise stretched, thereby reducing the thickness of the elastic material. With the thickness of the elastic material reduced by the stretching, the device is inserted into a hole in the mating part. Then the tension on the elastic material is removed, allowing the elastic material to increase in thickness, so as to fill substantially all of the gap between the device and the mating part. The coupling may act as an effective heat transfer device for transmitting (by conduction) heat produced by a heat-producing device, to the mating part, which may act as, or be thermally coupled to, a heat sink. The elastic material may be a material that is a good conductor of heat, for example, being a silicone material with metal particles, such as silver particles, added. The coupling may also help secure the device within the mating part, for example by preventing rotation of the device. In addition, the coupling may act as an electromagnetic shield around the device, through use of electrically conductive materials in the elastic material. The elastic material may have the characteristic that it fills substantially all of the gap between the heat-producing device and the mating part, in an attempt to return to its unstretched state. The coupling may be used to secure devices of any of a variety of shapes.

Figure 1:
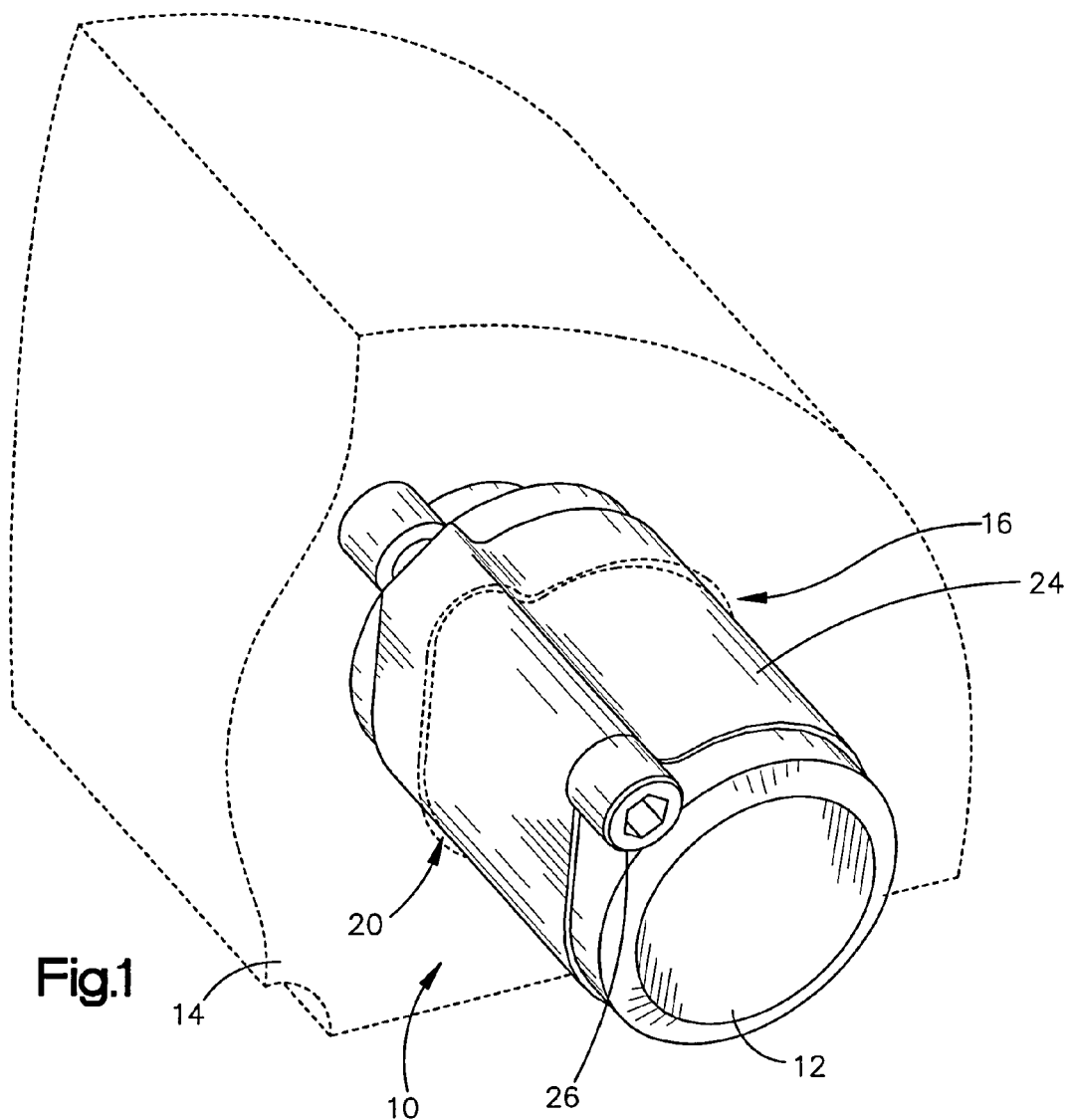
FIG. 1 is an oblique view of a coupling in accordance with the present invention.
Figure 2:
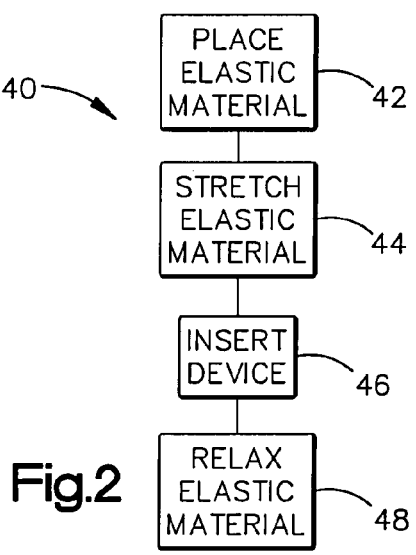
FIG. 2 is a plan view of the coupling of FIG. 1.

Referring initially to FIGS. 1 and 2, a coupling 10 couples together a device 12 and a mating part 14. The device 12 may be a heat-producing device, such as any of a variety of devices that produce heat in operation. Examples of heat-producing devices include motors, batteries, various electronic and electromechanical devices, and other such devices. The mating part 14 may be a housing or other mating part, and may be or may be coupled to a heat sink. More broadly, the mating part 14 may be a part that is capable of receiving heat from the device 12.

The coupling 10 may also have other characteristics instead of, or in addition to, thermal transfer. The coupling 10 may provide an electrical ground path between the device 12 and the mating part 14. In addition, the coupling 10 may shield the device 12 against radio frequency interference or other electromagnetic interference, through electrically conductive material in the elastic material. Further, the coupling 10 may function as an anti-rotation device, preventing or inhibiting rotation of the device 12 relative to the mating part 14.

The mating part 14 includes a hole 16 for receiving the device 12 and the coupling 10. The coupling 10 fills at least part of a gap 20 between the device 12 and the mating part 14.

The coupling 10 includes an elastic material 24, which is wrapped around the device 12, and a tensioner 26, such as a bolt or a screw, which is used to stretch the elastic material 24. The elastic material 24 may be a sheet material, wrapped around a perimeter of the device 12. The elastic material 24 is suitably coupled to the tensioner 26, such that suitable movement of the tensioner 26 results in stretching or relaxing of the elastic material 24. For example, the tensioner 26 may include a slot 30 through which the elastic material 24 passes. Rotation of the tensioner 26 may therefore stretch the elastic material 24, while rotation of the tensioner 26 in an opposite direction may be used to relax the stretched elastic material 24.

It will be appreciated that a variety of mechanical devices may be used as tensioner 26, to selectively stretch and relax the elastic material 24. The elastic material 24 may be coupled to tensioner in any of a variety of ways, for example by passing through slots in the tensioner 26, or by being attached to the tensioner 26.

The elastic material 24 may be any material which has suitable characteristics. Desirable characteristics for the elastic material 24 include high thermal conductivity and a high degree of stretchability. That is, the elastic material 24 should have characteristics such that it can be stretched without undue application of force, in order to reduce the thickness of the elastic material 24. Other possible desirable characteristics for the elastic material 24 include being at least partially electrically conductive, showing a high coefficient of friction in contact with the material of the device 12 and/or the mating part 14, and having a tendency toward regaining its original shape after being stretched (following the removal of the stretching force).

One example of a suitable material for the elastic material 24 is a silicone-based material having metallic particles interspersed therewithin. One such material is a commercially-available silicone material having silver particles in it. Such materials are sold under the trademarks CHO-SEAL and CHO-SIL, from Parker Chomerics, of Woburn, Mass., USA.

FIG. 3 is a high-level flowchart of a method 40 of coupling together the device 12 and the mating part 14, using the coupling 10. In step 42 the elastic material 24 is placed around the device 12. Tension from the elastic material 24 may be sufficient to maintain the coupling 10 on the device 12. Therefore there may not be any need for a structure for mechanically coupling the coupling 10 to the device 12, as the elastic force from stretching of the elastic material 24 around the device 12 may be sufficient to maintain the tensioner 26 coupled to the device 12.

In step 44, illustrated in FIG. 4, the elastic material 24 is stretched so as to reduce its thickness. This may be done by turning the tensioner 26. Increasing the tension on the elastic material 24 increases the length of the elastic material 24, which in turn reduces the thickness. As an example of the thickness reduction which may occur by stretching, a 0.040 inch (1 mm) thick silicone-based material, which is 1 inch (2.5 cm) long in its relaxed state, has its thickness reduced to 0.030 inches (0.75 mm) when its length is stretched to 1.1 inches (2.75 cm). The movement of the tensioner 26 to stretch and reduce thickness of the elastic material 24 may be by rotation or other suitable movement of the tensioner 26.

Thereafter, in step 46, illustrated in FIG. 5, the device 12 and the coupling 10, with the stretched elastic material 24, are inserted into the hole 16 of the mating part 14. Finally, in step 48, the tension on the elastic material 24 is relaxed, allowing the elastic material 24 to fill up the gap 20 between the device 12 and the mating part 14. It will be appreciated that it is desirable that the relaxed thickness of the elastic material 24 be such that it is able to fill the entire gap 20 between the device 12 and the heat sink or mating part 14. The elastic material 24 may be such that it tends to creep back over time, so as to fill substantially all of the gap 20 around the device 12. The creeping elastic material 24 may fill in any spaces or discontinuities between the device 12 and the mating part 14.

Figure 6:
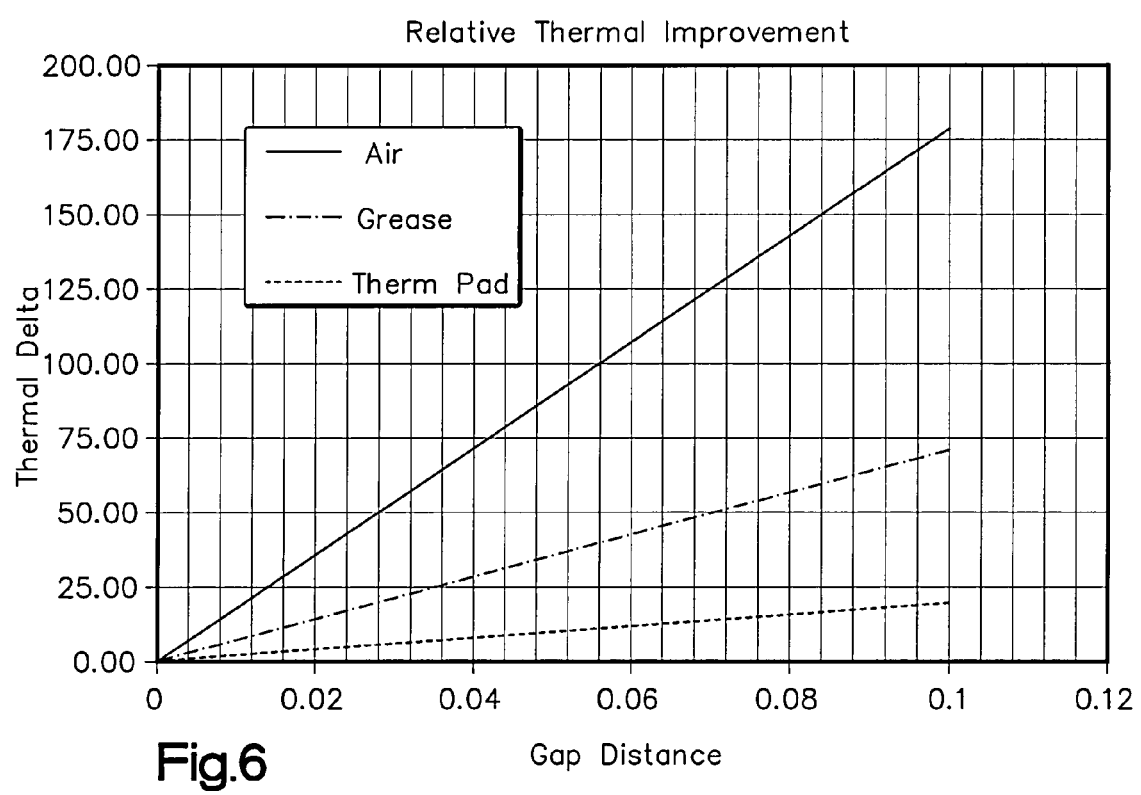
FIG. 6 is a graph showing the thermal performance of a coupling in accordance with the present invention, compared with prior art methods.
Figure 7:
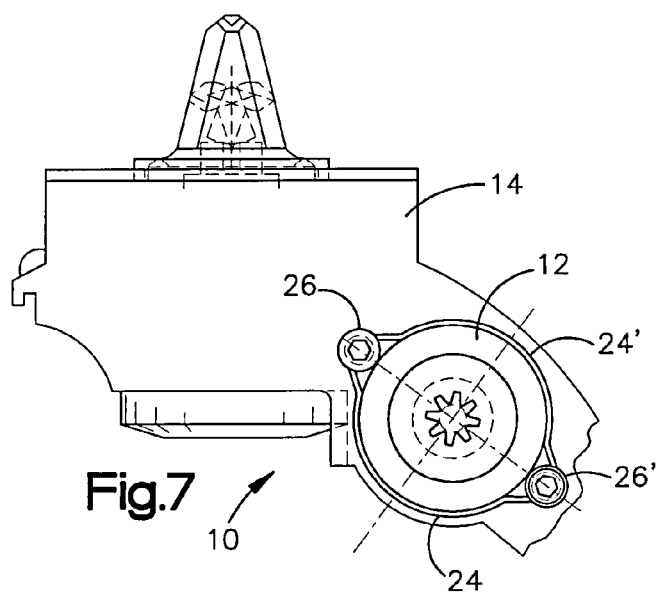
FIG. 7 is an end view of an alternate embodiment coupling in accordance with the present invention.
Figure 8:
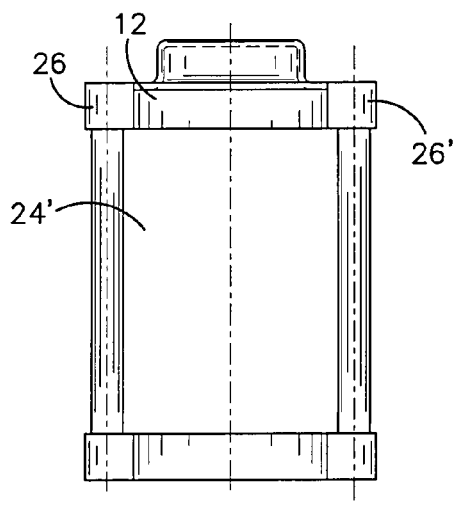
FIG. 8 is a side view of the coupling of FIG. 7.
Figure 9:
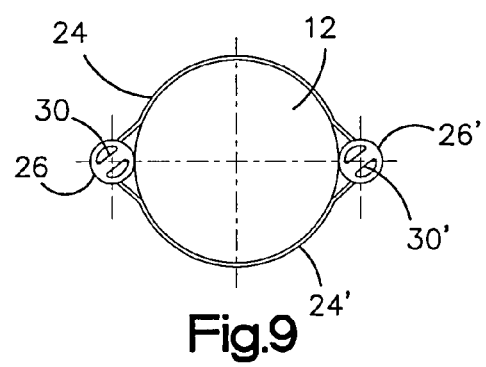
FIG. 9 is a cross-sectional end view of the coupling of FIG. 7.

The use of the coupling 10 between the device 12 and the mating part 14 may result in substantially improved heat transfer between the device 12 and the mating part 14, as compared with prior art methods. FIG. 6 illustrates the temperature difference between a heat-producing device 12 and a mating part heat sink 14 for three configurations: 1) an air gap between the heat-producing device, and the mating part; 2) the gap between the heat-producing device and the mating part filled with thermal grease; and 3) use of an elastic material between the heat-producing device 12 and the mating part 14.

As can be seen from the results in FIG. 6, using the elastic material 24 in the gap 20 results in approximately one-third the temperature difference as the use of thermal grease, and approximately one-eighth the temperature difference of an unfilled air gap. Therefore use of the elastic material 24 may result in a three-fold increase in heat transfer over thermal grease, and an approximately eight-fold increase in heat transfer over an unfilled air gap.

In addition to the noted advantage in heat transfer, use of the elastic material 24 may provide other advantages as well, or in the alternative. In comparison with thermal grease, the coupling 10 is less messy, and allows for easier installation. In addition, the elastic material 24 may aid in preventing rotation of the device 12 relative to the mating part 14. The use of electrically conductive particles in the elastic material 24, such as suitable metallic particles, may provide advantages in shielding the device 12 against the electromagnetic interference and/or radio frequency interference. Such interference may be undesirable, especially with regard to electronic devices. As a further advantage, the coupling 10 may provide physical sealing between the device 12 and the mating part 14. This physical sealing may prevent undesirable ingress of dirt, water, or other contaminants, into the space between the device 12 and the mating part 14. Preventing ingress of contaminants may aid in reliability of the device 12 for a variety of types of devices, such as motors and electronic devices. As another possible advantage, if the elastic material 24 is electrically conductive, the coupling 10 may provide electrical grounding of the outside of the device 12 to the mating part 14.

Although the device shown in the Figures and described above is generally cylindrical, it will be appreciated that couplings of the sort described above may be employed with any of a variety of shapes of devices. Examples of other possible shapes of the device include polygonal shapes such as rectangular, square, and triangular, and rounded shapes such as elliptical, as well as irregular shapes.

Figure 10:
FIG. 10 is an end view of a portion of the coupling of FIG. 7.
Figure 11:
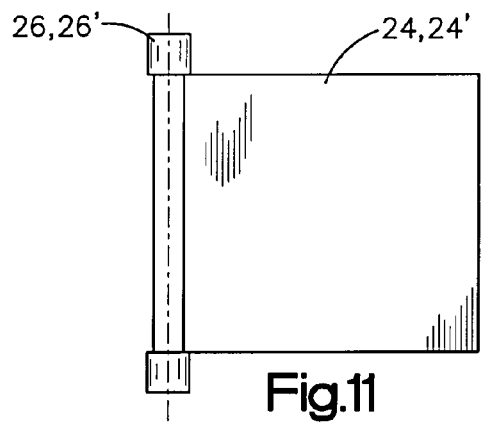
FIG. 11 is a side view of the portion of FIG. 10.

FIGS. 7-11 illustrate a variation for the coupling 10, which utilizes a pair of tensioners 26 and 26', for selectively stretching a pair of elastic materials 24 and 24'. Either or both of the tensioners 26 and 26' may be used to stretch and/or relax the elastic materials 24 and 24'. It may be desirable to utilize multiple tensioners 26 and 26' for larger devices 12, in order to obtain more uniform stretching and thickness of the elastic materials 24 and 24'. As illustrated in FIGS. 10 and 11, the elastic materials 24 and 24' may enter into and/or pass through respective slots 30 and 30'. The elastic materials 24 and 24' may be attached directly to the tensioners 26 and 26'. Alternatively, or in addition, the elastic material 24 and 24' may have ends that are run through the slots and attached to other portions of the elastic materials 24 and 24'. It will be appreciated that many suitable methods may be used for mechanically coupling the elastic materials 24 and 24' to one or both of the tensioners 26 and 26'.

It will be appreciated that other configurations are possible, for example, using 3 or more tensioners or tensioning devices.

The diameter of the device may be from about 1 to about 5 inches (about 2.5 to 12.7 cm), although it will be appreciated that other diameters are possible. The relaxed thickness of the elastic material 24 may be from about 0.015 inches to 0.2 inches (about 0.4 to 5 mm), although again it will be appreciated that other values are possible. It will further be appreciated that a variety of thicknesses of the elastic material 24 may be maintained, with a suitable thickness selected depending upon the size of the hole 16 into which the device 12 is to be placed. Therefore, use of the coupling 10 may allow some flexibility in inserting devices 12 into holes 16 of various sizes.

The amount of thickness reduction caused by stretching the elastic material 24 may be from approximately 0.005 to 0.020 inches (about 0.13 to 0.5 mm), although again, other changes in thicknesses are possible.

Figure 12:
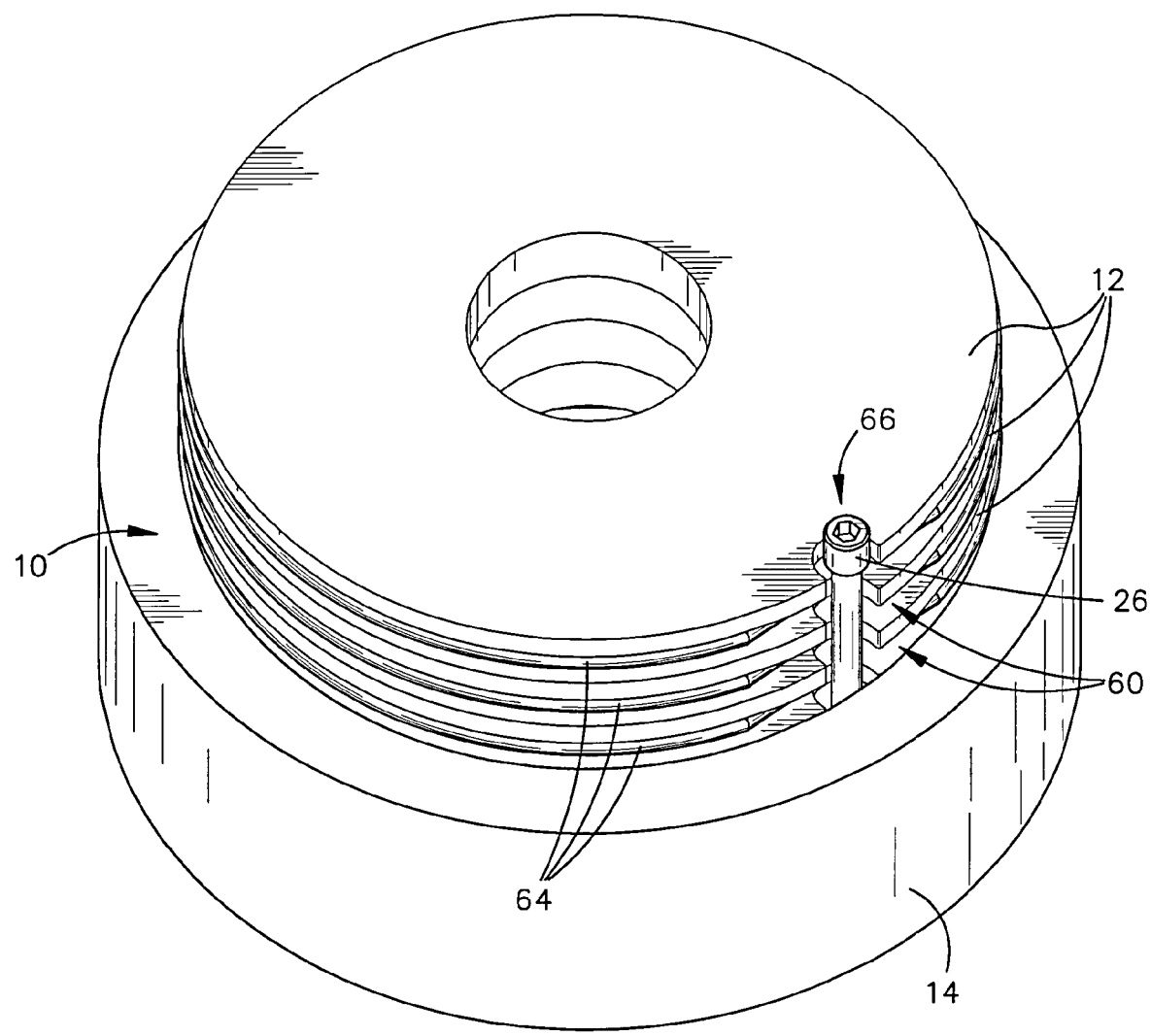
FIG. 12 is an oblique view of yet another alternate coupling in accordance with the present invention.
Figure 13:
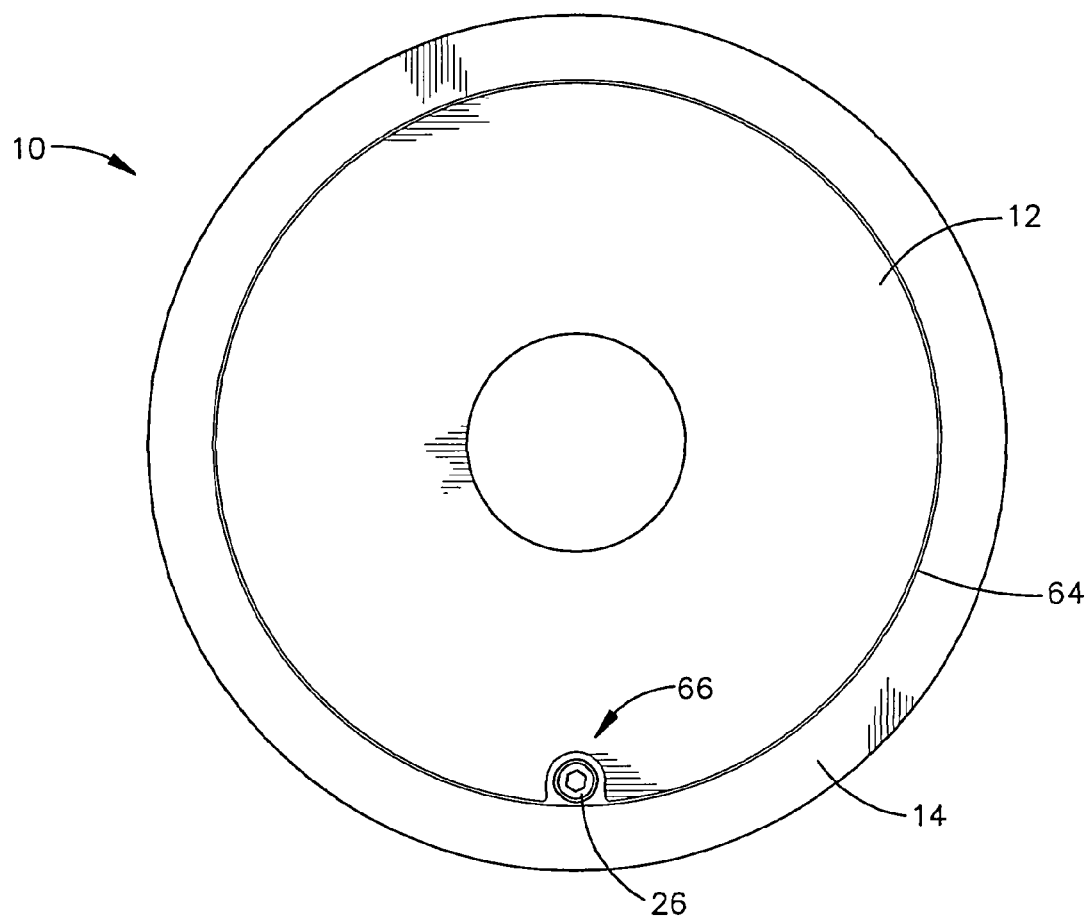
FIG. 13 is a plan view of the coupling of FIG. 12.
Figure 14:
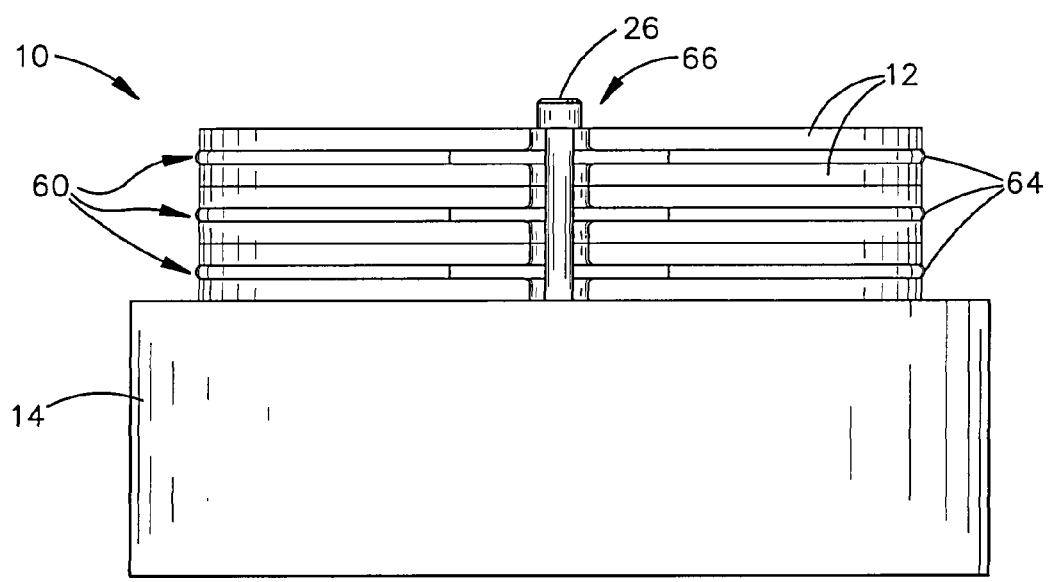
FIG. 14 is a side view of the coupling of FIG. 12.

FIGS. 12-14 illustrate another configuration of the coupling 10, for use in transferring heat or otherwise coupling a stack of cylindrical disk-shaped devices 12, such as circuit boards. The devices 12 are stacked atop one another, with grooves 60 between adjacent of the devices 12. Tubes 64 of the elastic material are situated in the grooves 60. Each of the elastic material tubes 64 is coupled to a tensioner 26, such as a screw or bolt. The tubes 64 may pass through slots in the tensioner 26, and the tensioner may pass through notches 66 in the devices 12. The tubes 64 may have hollow centers, making them easy to deform. Stretching the elastic material tubes 64 by turning the tensioner 26 reduces the outer diameter of the hoops formed by the tubes 64, causing the tubular cross-section elastic material 64 to be pulled inward within the grooves 60. Stretching the tubular elastic material 64 thereby reduces the overall diameter of the devices 12 and the coupling 10, allowing them to be inserted into the hole 16 in the heat sink or mating part 14. After insertion, the movement of the tensioner 26 is reversed, relaxing the stresses imposed by the tensioner 26 on the elastic material tubes 64. This causes the elastic material tube 64 to expand, pressing up against the walls of the mating part 14, and pressing up against the top and bottom surfaces of the devices 12. Thus good contact is made with both the devices 12 and the mating part or heat sink 14.

Figure 15:
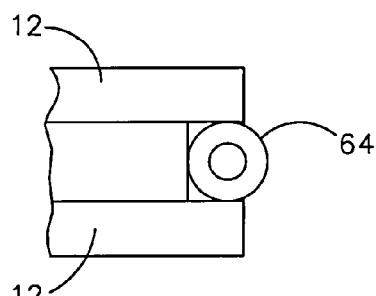
FIG. 15 is a side cross-sectional view of a portion of the coupling of FIG. 12, in a relaxed state.
Figure 16:
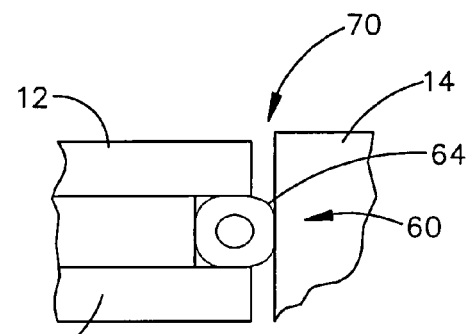
FIG. 16 is a side cross-sectional view of the portion of FIG. 15, in its installed state.

It will be appreciated that the coupling 10 shown in FIGS. 12-14 may have several advantages relative to the other embodiments of the coupling 10 discussed herein. Use of the elastic material 64 in a tubular form rather than the sheet elastic material 24 may allow easier deformation of the elastic material. Thus, the size of the gap to be filled by the elastic material tube 64 may be bigger than that filled by the elastic material 24. In addition, use of the tubular elastic material 64 allows contact to be made with tops and bottoms of the devices 12, rather than just edges of the devices. This may allow greater heat transfer, compared with elastic material only making edge contact with devices. Further, creep of the tubular elastic material 64 may aid in producing contact over more of the surface, and with more pressure, than can be done with the sheet elastic material 24. This is illustrated in FIGS. 15 and 16. In FIG. 15, the relaxed tubular elastic material 64 in the groove 60 makes contact with a relatively small amount of the top and bottom surfaces of the devices 12. After stretching of the elastic material 64, insertion of the devices 12 and the coupling 10 into the mating part 14, and relaxation of the elastic material 64, the configuration is that shown in FIG. 16. Since the tubular elastic material 64 cannot regain its relaxed state, due to the constraining presence of the mating part 14 across a gap 70, the tubular elastic material 64 fills more of the groove 60, contacting a greater area on the top and bottom of the major surfaces of the adjoining devices 12. In addition, the tubular elastic material 64 contacts a sizeable proportion of the part of the mating piece 14 that is opposite the groove 60.

Figure 17:
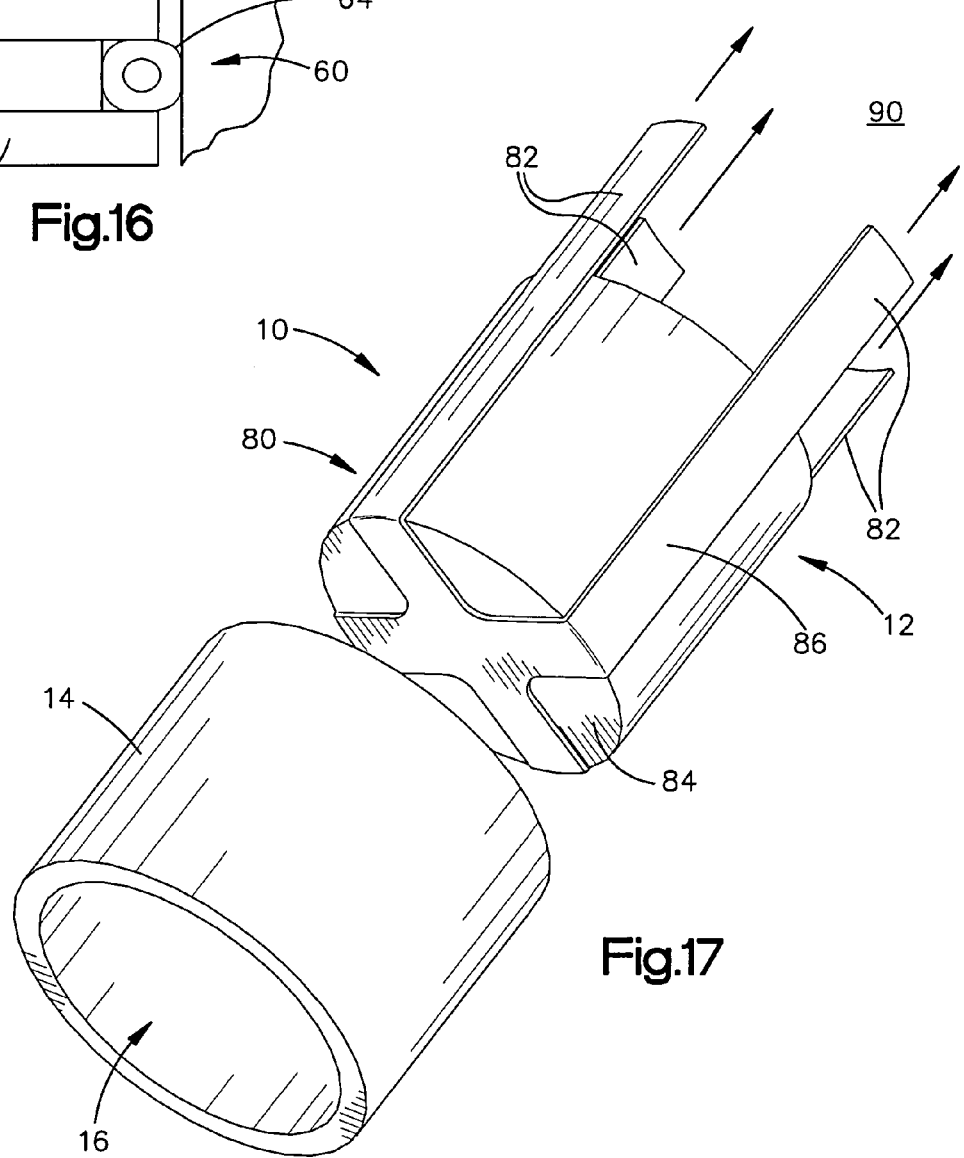
FIG. 17 is an oblique view of another embodiment of a coupling in accordance with the present invention.

FIG. 17 shows another configuration of the coupling 10, wherein sheet elastic material 80 includes elastic material strips 82. The strips 82 are anchored at one end 84 of a device 12, and proceed along sides 86 of the device 12. The strips 82 may be stretched from their free ends, in the direction 90, to reduce their thickness. With the strips 82 stretched, the coupling 10 and the device 12 may be inserted into the corresponding hole 16 in the mating part 14. Then tension on the elastic material 80 may be relaxed, allowing the elastic material strips 82 to fill the gap between the sides 86 and the mating part 14.

The elastic material 80 is shown as having a cruciform shape, with the strips 82 anchored merely by placing the cross of material over the end 84 of the device 12. It will be appreciated that the elastic material 80 may have any of a wide variety of configurations, with different numbers of strips, or with different ways of anchoring one end of each of the strips.

Figure 18:
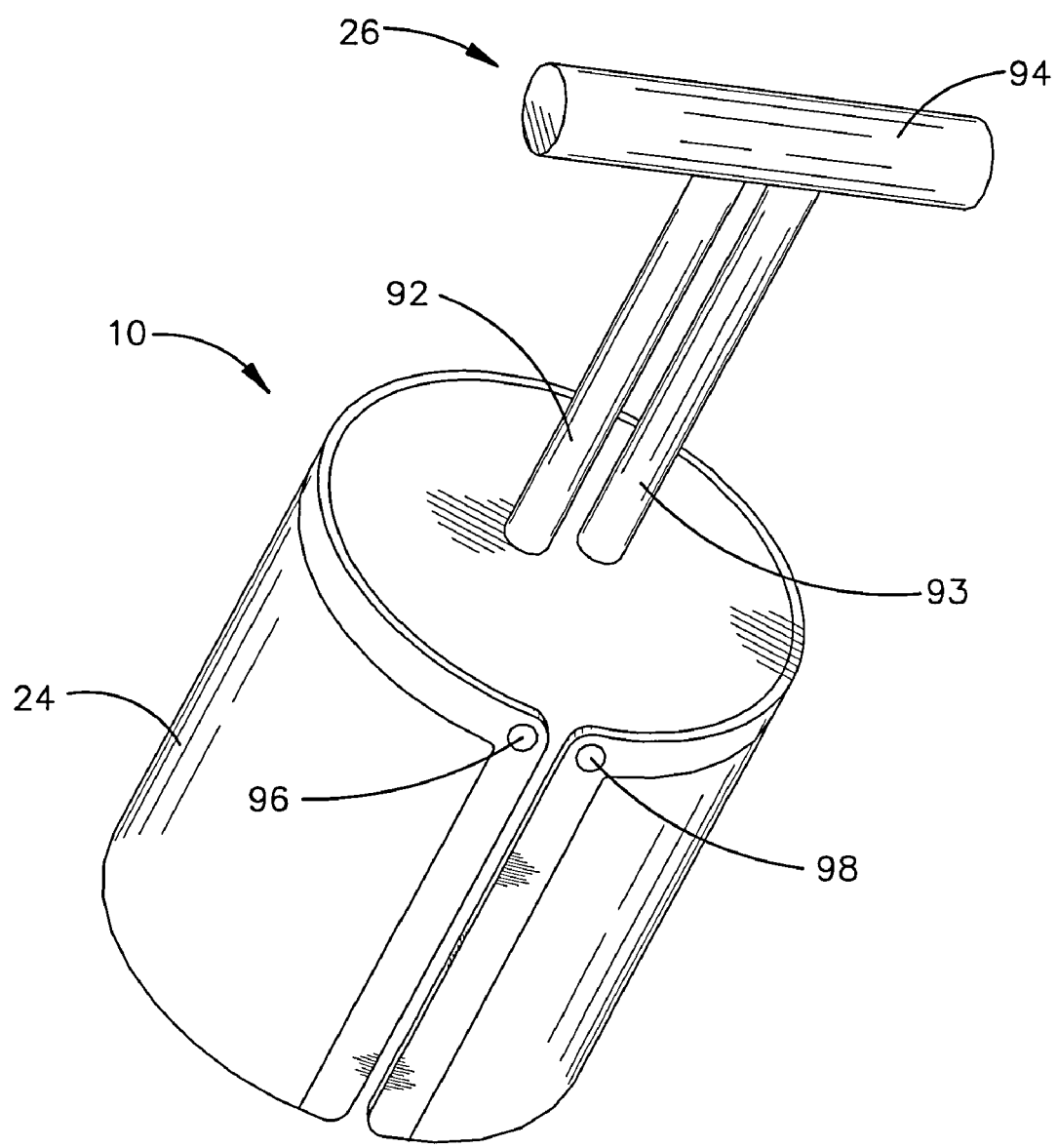
FIG. 18 is an oblique view of a tensioner for use in the present invention.

FIG. 18 illustrates another configuration for a tensioner 26 for stretching an elastic material 24. The tensioner 26 shown in FIG. 18 has a pair of prongs 92 and 93 that protrude from a handle 94. The prongs 92 and 93 are inserted into respective pockets 96 and 98 at ends of the elastic material 24. The handle 94 may then be turned to produce tension that stretches the elastic material 24. After insertion of the device 12 into the mating part 14 (FIG. 1), turning the handle 94 in the opposite direction releases the tension on the elastic material 24. Alternatively, it may be possible to release the tension of elastic material 24 by sliding the prongs 92 and 93 out of the pockets, thereby disengaging the tensioner 26 from the elastic material.

It will be appreciated that the tensioner 26 of FIG. 18 may allow increased mechanical advantage, relative to a bolt, due to the presence of the handle 94. This facilitates the stretching (tensioning) and relaxing of the elastic material 24. Also, the tensioner 26 may be re-usable, as it is not necessarily permanent coupled to the elastic material 24.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A method of coupling a device to a mating part, the method comprising:
    stretching an elastic material that is in contact with the device;
    inserting the elastic material and the device into a hole in the mating part, wherein the inserting includes placing the elastic material in at least part of a gap between the device and the mating part, with a space between the elastic material and the mating part; and
    after the inserting, relaxing the elastic material, thereby allowing the elastic material to fill the at least part of the gap between the device and the mating part, wherein the relaxing includes the elastic material filling the space and coming into direct contact with both the device and the mating part, and mechanically coupling the device to the mating part;
    wherein the elastic material is a sheet elastic material;
    wherein the stretching the sheet elastic material thins the sheet elastic material; and
    wherein the relaxing increases thickness of the sheet elastic material.

2. The method of claim 1, wherein the sheet elastic material is a silicone material with metal particles therein.

3. The method of claim 2, wherein the stretching includes stretching the sheet elastic material by rotating a tensioner that is coupled to the sheet elastic material.

4. The method of claim 3, wherein the sheet elastic material passes through a slot in the tensioner.

5. The method of claim 3, wherein the relaxing includes rotating the tensioner in an opposite direction from a direction that the tensioner is rotated in the stretching.

6. The method of claim 2, wherein the stretching includes increasing length of the sheet elastic material by at least 10%.

7. The method of claim 1, wherein the sheet elastic material is along a perimeter of the device.

8. The method of claim 7, wherein the device is a cylindrical device.

9. The method of claim 8, wherein the relaxing includes the sheet elastic material increasing in thickness in a radially outward direction, filling substantially all of the gap.

10. The method of claim 1, wherein a relaxed thickness of the elastic material is from 0.015 inches to 0.2 inches (0.4 to 5 mm).

11. A method of coupling a device to a mating part, the method comprising:
    stretching an elastic material that is in contact with the device;
    after the stretching, inserting the elastic material and the device into a hole in the mating part; and
    after the inserting, relaxing the elastic material, thereby allowing the elastic material to fill at least part of a gap between the device and the mating part to mechanically couple the device to the mating part;
    wherein the stretching includes stretching the elastic material by rotating a tensioner that is coupled to the elastic material; and
    wherein the relaxing includes rotating the tensioner in an opposite direction from a direction that the tensioner is rotated in the stretching.

12. The method of claim 11, wherein the elastic material passes through a slot in the tensioner.

13. The method of claim 11,
    wherein the tensioner includes a pair of prongs attached to a handle; and
    wherein the rotating the tensioner includes rotating the handle while the prongs are in pockets in the elastic material.

14. A method of coupling a device to a mating part, the method comprising:
    stretching an elastic material that is in contact with the device;
    inserting the elastic material and the device into a hole in the mating part, wherein the inserting includes placing the elastic material in at least part of a gap between the device and the mating part, with a space between the elastic material and the mating part; and
    after the inserting, relaxing the elastic material, thereby allowing the elastic material to fill the at least part of the gap between the device and the mating part to mechanically couple the device to the mating part;
    wherein the relaxing includes filling the space and placing the elastic material in direct contact with both the device and the mating part.

15. The method of claim 14, wherein the relaxing includes the elastic material inhibiting rotation of the device relative to the mating part.

16. The method of claim 14, wherein the relaxing includes the elastic material providing sealing between the device and the mating part across the at least a part of the gap.

17. The method of claim 14, wherein the elastic material is a tubular material.

18. The method of claim 17, wherein the tubular material is a silicone material with metal particles therein.

19. The method of claim 17, wherein, throughout the stretching, the inserting, and the relaxing, the tubular material is situated in a groove, in contact with a major surface of the device.

20. The method of claim 19,
    wherein the tubular material is also in contact with another device;
    wherein the inserting also includes inserting the another device into the hole while the elastic material is in contact with both of the devices; and
    wherein the devices are disk-shaped.

21. The method of claim 17, wherein the tubular material has a hollow center.

* * * * *